(12) United States Patent
Han

(10) Patent No.: US 8,391,813 B2
(45) Date of Patent: Mar. 5, 2013

(54) METHOD AND APPARATUS FOR CONTROLLING TRANSMISSION POWER

(75) Inventor: Kyu Sung Han, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 12/655,780

(22) Filed: Jan. 7, 2010

(65) Prior Publication Data

US 2010/0173664 A1    Jul. 8, 2010

(30) Foreign Application Priority Data

Jan. 7, 2009  (KR) .................. 10-2009-0001205

(51) Int. Cl.
*H04B 1/02* (2006.01)
(52) U.S. Cl. .................................................. 455/127.1
(58) Field of Classification Search ............... 455/67.11, 455/127.1, 127.5, 574
See application file for complete search history.

(56) References Cited

U.S. PATENT DOCUMENTS

| | | | | |
|---|---|---|---|---|
| 6,788,930 | B2* | 9/2004 | Casaccia et al. | 455/414.1 |
| 6,898,438 | B1* | 5/2005 | Uchida | 455/522 |
| 7,280,828 | B1* | 10/2007 | Shah | 455/434 |
| 7,349,715 | B2* | 3/2008 | Kang | 455/522 |
| 2002/0094835 | A1* | 7/2002 | Hayashi et al. | 455/522 |
| 2004/0203450 | A1* | 10/2004 | Cho | 455/67.11 |
| 2009/0286496 | A1* | 11/2009 | Yavuz et al. | 455/127.1 |

* cited by examiner

*Primary Examiner* — Blane J Jackson

(57) ABSTRACT

A portable terminal includes an apparatus for controlling transmission power. The apparatus includes a storage unit that stores a first maximum transmission power corresponding to the maximum power that can be transmitted when intensity of reception signal is more than a predefined reference value and a second maximum transmission power corresponding to the maximum power that can be transmitted when intensity of the reception signal is less than the reference value. A controller can transmit a call connection request signal with the first maximum transmission power or with the second maximum transmission power depending on intensity of the reception signal when user tries a call connection. A power amplifier module (PAM) can amplify the call connection request signal according to the control of the controller.

20 Claims, 3 Drawing Sheets

METHOD AND APPARATUS FOR CONTROLLING TRANSMISSION POWER

CROSS-REFERENCE TO RELATED APPLICATION(S) AND CLAIM OF PRIORITY

The present application is related to and claims the benefit under 35 US.C. §119 (a) of a Korean patent application filed in the Korean Intellectual Property Office on Jan. 7, 2009 and assigned Serial No. 10-2009-0001205, and the entire disclosure of which is hereby incorporated by reference.

TECHNICAL FIELD OF THE INVENTION

The present invention relates to a method and apparatus for controlling transmission power, and more particularly, to a method and apparatus for controlling transmission power, which can improve transmission success rate in a weak electric field area where intensity of reception signal is less than a preset reference value.

BACKGROUND OF THE INVENTION

Generally, a portable terminal can control transmission power according to the distance to a base station. To this end, a portable terminal can measure intensity of reception signal, and can control intensity of transmission signals in inverse proportion to the intensity of the reception signal. That is, the portable terminal can control a power amplifier module (PAM) according to the intensity of the reception signal.

The power amplifier module (PAM) is a device for amplifying a small signal into a large signal, and can differentiate the amplification extent of a transmission signal according to a control signal. As the amplification extent becomes higher, the PAM consumes more power. That is, as the amplification extent becomes higher, the PAM consumes more current of the battery. Hence, the conventional portable terminal limits the maximum transmission power of the PAM. Such a conventional portable terminal has a problem in that it has a low transmission success rate in a weak electric field area where intensity of reception signal is less than the reference value due to the limited maximum transmission power. Such a problem can cause inconvenience to user because user has to try several times to be connected to opponent in such a weak electric field area.

SUMMARY OF THE INVENTION

To address the above-discussed deficiencies of the prior art, it is a primary object to provide a method and apparatus for controlling transmission power, which can improve a transmission success rate in a weak electric field area and can minimize battery current consumption.

In accordance with an aspect of the present invention, an apparatus for controlling transmission power includes: a storage unit that stores a first maximum transmission power corresponding to the maximum power that can be transmitted when intensity of reception signal is more than a predefined reference value and a second maximum transmission power corresponding to the maximum power that can be transmitted when intensity of the reception signal is less than the reference value; a controller that is configured to transmit a call connection request signal with the first maximum transmission power or with the second maximum transmission power depending on intensity of the reception signal when user tries a call connection; and a power amplifier module (PAM) that amplifies the call connection request signal according to the control of the controller.

In accordance with another aspect of the present invention, a method for controlling transmission power includes: setting a first maximum transmission power corresponding to the maximum power that can be transmitted when intensity of the detected reception signal is more than a given reference value, and a second maximum transmission power corresponding to the maximum power that can be transmitted when intensity of the reception signal is less than the reference value; detecting intensity of reception signal; and transmitting a call connection request signal with the first maximum transmission power or with the second maximum transmission power depending on the intensity of the reception signal when user tries a call connection.

In accordance with another aspect of the present invention, A portable terminal capable of controlling transmission power, the portable terminal includes: a storage unit configured to stores a first maximum transmission power and a second maximum transmission power, the first maximum transmission power corresponding to a maximum power that can be transmitted when intensity of reception signal is a predefined reference value or more, and the second maximum transmission power corresponding to a maximum power that can be transmitted when intensity of the reception signal is less than the reference value; a controller configured to transmit a call connection request signal with the first maximum transmission power or with the second maximum transmission power depending on intensity of the reception signal when user tries a call connection; and a power amplifier module (PAM) configured to amplify the call connection request signal under the control of the controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
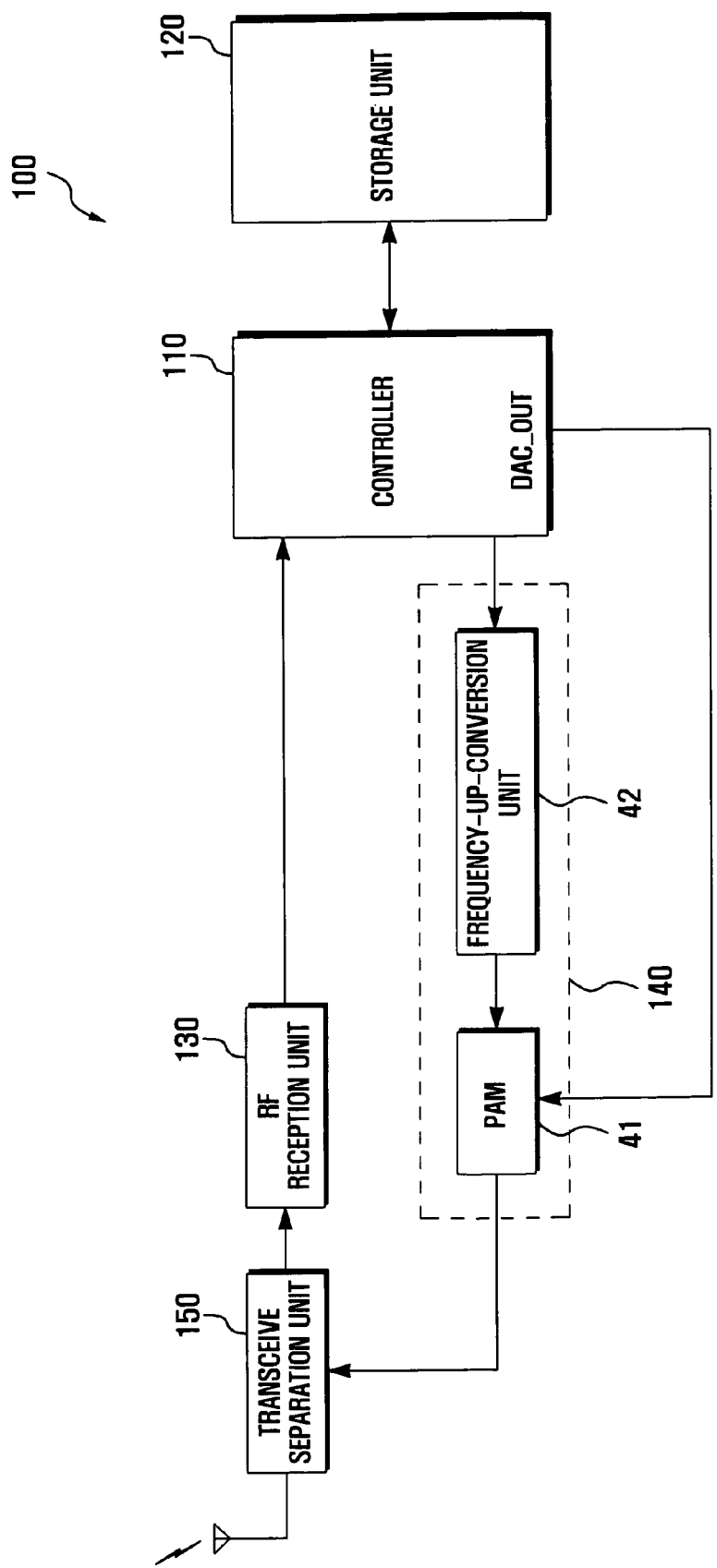
FIG. 1 illustrates a configuration of a portable terminal according to an exemplary embodiment of the present invention.
Figure 2:
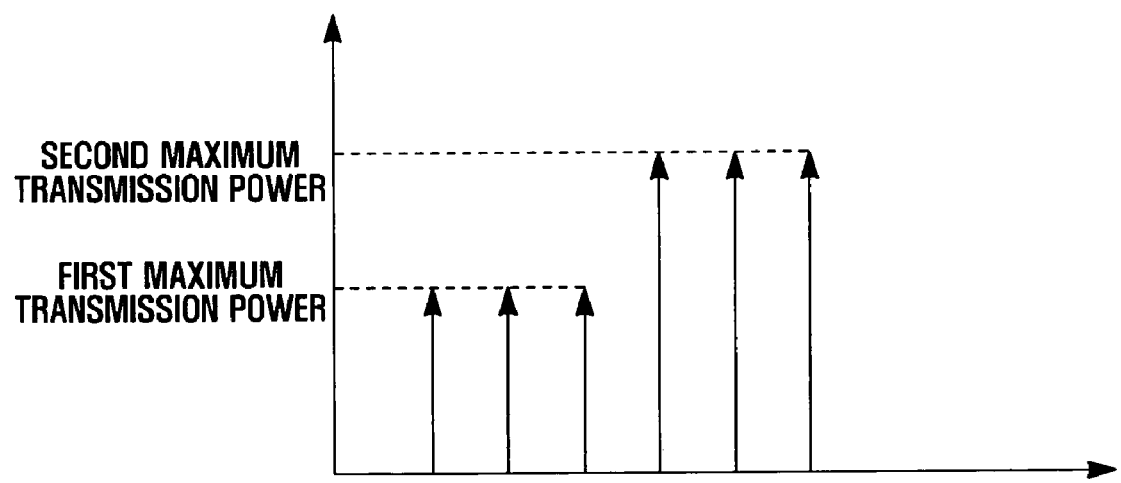
FIG. 2 illustrates transmission power of a call connection request signal when user tries a call connection in a weak electric field area according to an exemplary embodiment of the present invention.
Figure 3:
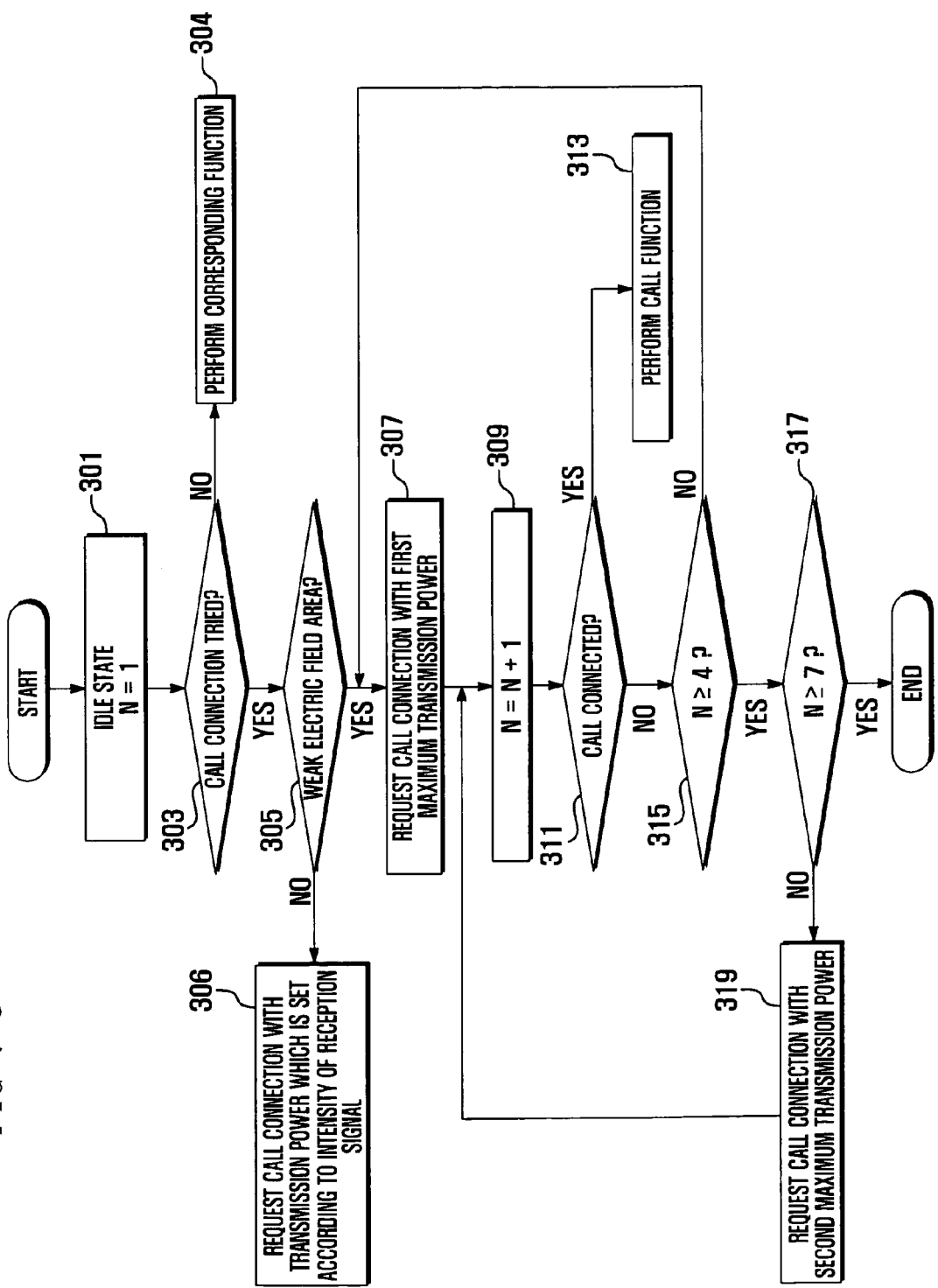
FIG. 3 illustrates a process for controlling transmission power according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged terminal.

In the meantime, it is to be understood that the following disclosure is provided for exemplary purposes only and is not intended as a limitation of the present invention. Furthermore, all alternate embodiments which are obvious modifications of this disclosure are intended to be encompassed within the scope of the present invention.

Hereinafter, "weak electric field" refers to an electric field area where intensity of reception signal is less than a preset reference value. For example, the weak electric field may refer to an area where intensity of reception signal is less than −100 dBm. Also, the weak electric field may refer to an area where intensity of transmission signal in GSM 850 and GSM 900 bands is 5 level, or intensity of transmission signal in DCS1800 and PCS1900 bands is 0 level.

Hereinafter, "a first maximum transmission power" refers to the maximum power that can be transmitted by a portable terminal in case intensity of reception signal is more than the reference value. The first maximum transmission power can be set as a value that is decreased with a given amount from the maximum power value that can be amplified by a power amplifier module (PAM) in consideration of current consumption of the battery.

Hereinafter, "a second maximum transmission power" refers to the maximum power which can be transmitted by a portable terminal in case the intensity of the reception signal is less than the reference value. It is desirable for the second maximum transmission power to be set as a value that is greater than the first maximum transmission power in order to improve the transmission success rate in the weak electric field area.

Hereinafter, a "transmission success rate" refers to the ratio of the number of entire call connection attempts to the number of call connection successes. Such a transmission success rate can be one of the indicators that show transmission performance of a portable terminal in a weak electric field area.

FIG. 1 illustrates a configuration of a portable terminal according to an exemplary embodiment of the present invention, and FIG. 2 illustrates transmission power of a call connection request signal when user tries a call connection in a weak electric field area according to an exemplary embodiment of the present invention.

Before a detailed explanation, a method for controlling transmission power of a general portable terminal 100 is briefly explained. A portable terminal 100 can control intensity of transmission signals according to the distance to a base station. To this end, the portable terminal 100 measures intensity of signals received from a base station, and in case the intensity of the reception signal is high, the portable terminal 100 determines that it is close to the base station so that it decreases intensity of transmission signal, whereas in case the intensity of the reception signal is weak, the portable terminal 100 determines that it is far from the base station so that it increases intensity of transmission signal. Hence, the portable terminal 100 can transmit a call connection request signal to the base station with the transmission power corresponding to the intensity of reception signal when user tries a call connection. At this time, if a call connection is not made, the portable terminal 100 can increase the transmission power by a predefined amount (e.g., 1 dBm), and can transmit a call connection request signal to the base station. Such a process can be performed for a preset number of times (e.g., 6 times). If a call connection is not made even after call connection attempts for the preset number of times, the portable terminal 100 can display a message that informs that the call connection is impossible.

Referring to FIGS. 1 and 2, the portable terminal 100 can include a transceive separation unit 150, a radio frequency (RF) transmission unit 140, a radio frequency (RF) reception unit 130, a storage unit 120 and a controller 110.

The transceive separation unit 150 can separate a transmission signal and a reception signal of the portable terminal 100. The RF reception unit 130 can low-noise amplify radio signals received through an antenna, frequency-down-convert the amplified signals, and then transmit the converted signals to the controller 110. The RF reception unit 130 can receive a response signal for a call connection request transmitted by the portable terminal 100 from the base station.

The RF transmission unit 140 can frequency-up-convert and amplify signals outputted from the controller 110, and then transmit the signals through an antenna. To this end, the RF transmission unit 140 can include a power amplifier module (PAM) 41 and a frequency-up-conversion unit 42.

The frequency-up-conversion unit 42 can up-convert baseband signals transmitted from the controller 110 into RF signals. Particularly, the frequency-up-conversion unit 42 can up-convert a call connection request signal transmitted from the controller 110, i.e., a communication channel connection request signal, and can transmit the up-converted signal to the PAM 41.

The power amplifier module (PAM) 41 is an amplifier which amplifies small signals into large signals, and can amplify radio signals transmitted from the frequency-up-conversion unit 42. The amplification extent of such a PAM 41 can be controlled by control signals (DAC_OUT) of the controller 110 according to intensity of reception signal. Particularly, in case a call connection request signal is amplified in a weak electric field area, the power amplifier module (PAM) 41 can diversify the maximum transmission power under the control of the controller 110. Specifically, when user tries a call connection in a weak electric field area, the PAM 41 can amplify the call connection request signal to the first maximum transmission power for a preset number of times (e.g., 3 times). Additionally, if a call connection is not made even after call connection attempts for the preset number of times, the PAM 41 can amplify the call connection request signal to the second maximum transmission power. Here, the first maximum transmission power is the maximum power that can be transmitted by a portable terminal 100 in case intensity of reception signal is more than the reference value in consideration of battery current consumption, and can be set a value that is reduced by a certain amount (e.g., 1.5 dBm or 2 dBm) from the maximum value of the PAM 41. The second maximum transmission power is the maximum power that can be transmitted by a portable terminal 100 in case intensity of reception signal is less than the reference value, and can be the maximum value that can be amplified by the PAM 41, or can be set with a protective section for protecting the PAM 41.

The protective section can be 0.5 dBm to 1 dBm. Also, the first maximum power and the second maximum power can be differently set according to frequency bands (e.g., GSM 850, GSM 900, DCS 1800, PCS 1900) and channels of respective frequency bands.

The storage unit 120 can store user data as well as programs that are necessary for operating functions according to embodiments of the present invention. The storage unit 120 can include one or more volatile memory devices and non-volatile memory devices, and can include a program area and a data area.

The program area can store a program which controls overall operations of a portable terminal 100, an operating system which boots a portable terminal 100 and an application program which is necessary for other options of a portable terminal 100, such as a camera function, a digital broadcast reception function, an image or video playing function, a music playing function, a wireless Internet function and e-mail transmission function. Particularly, a program area according to the present invention can include an application program for controlling transmission power of a call connection request signal when user tries a call connection in a weak electric field area.

The data area is an area where data which is generated according to the usage of a portable terminal 100 are stored, and can store a phone book, a subway line map, a calendar, an alarm, and information corresponding to audio data and a pertinent contents, or user data. Particularly, a data area according to the present invention can store transmission power according to intensity of reception signal as the following Table 1.

TABLE 1

| Channel (190CH)/frequency band (GSM850) | | | |
|---|---|---|---|
| Intensity of reception signal (dBm) | Transmission signal level | Intensity of transmission signal | DAC value |
| −100 or less | Level 5 | 34 | 570 |
|  |  | 32.5 | 521 |
| more than −100 to −80 or less | Level 6 | 31 | 473 |
| more than −80 to −60 or less | Level 7 | 29 | 417 |
| more than −60 to −40 or less | Level 8 | 27 | 367 |
| more than −40 | Level 9 | 25 | 323 |
| ... | ... | ... | ... |

Table 1 shows a table in which intensities of transmission signals according to intensities of reception signal, that is, transmission power is stored after being mapped.

Referring to Table 1, intensities of transmission signals are divided according to levels, and digital-analog converter (DAC) values for controlling transmission power can be mapped to the levels. That is, the amplification extent of the PAM 41 can be controlled according to the DAC value transmitted from the controller 110. According to Table 1, two DAC values can be mapped to level 5 which indicates that the portable terminal 100 is in a weak electric field area. The two DAC values correspond to the first maximum transmission power and the second maximum transmission power. As shown in Table 1, the first maximum transmission power and the second maximum transmission power can be set 32.5 dBm and 34 dBm, respectively. However, the present invention is not limited to these values. That is, the first maximum transmission power and the second maximum transmission power can be set different values according to frequency bands and channels. Also, the DAC values can be values optimized through designer's experiments.

Further, Table 1 is an example of channel 190 of GSM (Global System for Mobile Communication) 850 band, but the present invention is not limited to Table 1. That is, the DAC values of Table 1 can be differently set according to frequency bands (e.g., GSM 900, DCS 1800 and PCS 1900) and channels of respective frequency bands.

The controller 110 can control overall operations of the portable terminal 100 and signal flows between internal blocks of the portable terminal 100. Particularly, if user tries a call connection, the controller 110 according to the present invention can transmit a call connection request signal, i.e., a communication channel connection request signal, through the RF transmission unit 140, based on the first maximum transmission power or the second transmission power depending on intensity of the reception signal. At this time, the controller 110 can control transmission power of the call connection request signal with reference to Table 1. To this end, the controller 110 can transmit control signals (DAC_OUT) to the PAM 41.

More particularly, in case a call connection attempt is sensed in a weak electric field area, the controller 110 can transmit a call connection request signal with the first maximum transmission power to the base station for a preset number of times, and if a call connection is not made within the preset number of times, the controller 110 can transmit the call connection request signal with the second maximum transmission power to the base station for a preset number of times. At this time, if a call connection is made with the second maximum transmission power, the controller 110 can change the power to the first maximum transmission power after a certain time (e.g., 2 seconds) in order to reduce battery power consumption due to the continuous use of the second maximum transmission power. Further, the controller 110 can terminate the call connection request if a call connection is not made with the second maximum transmission power within the preset number of times.

The controller 110 can transmit DAC values to the PAM 41 with reference to Table 1 in order to control the amplification extent of the call connection request signal. For example, in case the call connection request signal is transmitted with the first maximum transmission power, the controller 110 can transmit DAC value of 521 to the PAM 41, and in case the call connection request signal is transmitted with the second maximum transmission power, the controller 110 can transmit DAC value of 570 to the PAM 41.

For example, in case a call connection request signal is set to be transmitted up to six times at user's one call connection attempt, the controller 110 can transmit the call connection request signal with the first maximum transmission power for the first three times, and transmit the call connection request signal with the second maximum transmission power for the next three times. Likewise, by raising transmission power in a weak electric field area, the transmission success rate can be improved, compared with the transmission success rate of the conventional portable terminal which transmits the call connection request signal with the first maximum transmission power for six times.

Further, the present invention is not limited to FIG. 2. That is, when user tries a call connection in a weak electric field area, the controller 110 can transmit a call connection request signal with the first maximum transmission power for a preset number of times (e.g., 3 times), and if a call connection is not made with the first maximum transmission power, the controller 110 can control to transmit the call connection request signal while gradually increasing the transmission power from the first maximum transmission power to the second maximum transmission power by predefined amounts (e.g., 0.5 dBm). Also, when user tries a call connection in a weak electric field area, the controller 110 can perform the process of transmitting a call connection request signal with the first maximum transmission power and, if a call connection is not made with the first maximum transmission power, transmitting the call connection request signal with the second maximum transmission power, and repeat the process for a preset number of times. That is, the controller 110 can transmit the call connection request signal with the first maximum transmission power and the call connection request signal with the second maximum transmission power alternately.

Also, though not illustrated, the portable terminal 100 can further selectively include a camera module for taking images or videos, a short-range communications module for a short-range wireless communication, an audio signal output device such as a speaker, a voice signal input device such as a microphone, and a digital sound source playing module such as an MP3 module. It is not possible to list all elements because such elements can be modified in various manners due to the convergence trend of digital devices, but the portable terminal 100 according to the present invention may include the above-mentioned elements or the like.

The portable terminal 100 including the above-explained configuration can improve the transmission success rate in a weak electric field area, and can improve user's convenience by minimizing battery current consumption.

Until now, an apparatus for controlling transmission power according to an exemplary embodiment of the present invention was explained. Hereinafter, a method of controlling transmission power according to an exemplary embodiment of the present invention will be explained.

FIG. 3 illustrates a method of controlling transmission power according to an exemplary embodiment of the present invention.

Referring to FIG. 3, a controller 110 can be in idle state (block 301). At this time, N value, which represents the number of times of the call connection requests, can be initialized as '1'. Here, N is a natural number.

The controller 110 can sense a call connection attempt (block 303). At this time, if a call connection attempt is not sensed, the controller 110 can perform a corresponding function (block 304). For example, the controller 110 can remain in idle state. Alternatively, if a call connection attempt is sensed at block 303, the controller can check whether the location is a weak electric field area where intensity of reception signal is less than a given reference value (block 305). If the location is not a weak electric field area at block 305, the controller 110 can transmit a call connection request signal with a predetermined transmission power according to intensity of reception signal (block 306). To this end, it is desirable for the storage unit 120 to store a mapping table of transmission power according to intensity of reception signal in a form similar to that of Table 1. Alternatively, if the location is a weak electric field area at step 305, the controller 110 can transmit a call connection request signal with a first maximum transmission power (block 307). Here, the first maximum transmission power is the maximum power that can be transmitted by a portable terminal 100 in case intensity of reception signal is the reference value or more in consideration of battery current consumption, and can be set a value that is decreased by a certain amount from the maximum value of the PAM 41. The first maximum transmission power can be variously set according to frequency bands. For example, the first maximum transmission power can be set 32.5 dBm in GSM 850 and GSM 900 bands, and can be set 29.5 dBm in DCS 1800 and PCS 1900 bands.

Thereafter, the controller 110 can increase N by 1 (block 309), and can check whether a call connection is made, that is, a communication channel is formed with the base station by receiving a response signal to the call connection request signal from the base station (block 311).

If a call connection is made at step 311, the controller 110 can perform a call function (block 313). Alternatively, if a call connection is not made at block 311, the controller 110 can check whether N is '4' or more (block 315).

If N is less than '4' at block 315, the controller 110 can repeat the above-described process (block 307). Alternatively, if N is '4' or more at block 315, the controller 110 can check whether N is '7' or more (block 317). Here, if N is less than '7', the controller 110 can transmit the call connection request signal with the second maximum transmission power (block 319). Here, the second maximum transmission power is the maximum power that can be transmitted by the portable terminal 100 when intensity of reception signal is less than a given reference value, and can be the maximum value that can be amplified by the PAM 41, or can be a value which is increased by a protective section (e.g., 0.5 dBm to 1 dBm) from the maximum value. The second maximum transmission power can be set as a different value according to frequency bands. For example, the second maximum transmission power can be 34 dBm in GSM 850 and GSM 900 bands, or can be 31 dBm in DCS 1800 and PCS 1900 bands. Thereafter, the controller 110 can repeat the above process (block 309). If N is '7' or more at block 317, the controller 110 can terminate the call connection request.

Further, though not illustrated in FIG. 3, if a call connection is made with the second maximum transmission power in a weak electric field area, the controller 110 can change the power to the first maximum transmission power after a certain time (e.g., 2 seconds) in order to reduce battery current consumption by use of the second maximum transmission power. At this time, the user may sense a mute phenomenon where user temporarily cannot hear sounds, but by which the user can recognize that the current location is a weak electric field area, and can be encouraged to move to another area to use a voice call.

Summarizing the above-described present invention, the portable terminal detects intensity of reception signal, and sets transmission power to the first maximum transmission power corresponding to the maximum power that can be transmitted when intensity of the reception signal is a given reference value or more, and the second maximum transmission power corresponding to the maximum power that can be transmitted when intensity of the reception signal is less than the reference value. When user tries a call connection, the portable terminal can transmit a call connection request signal with the first maximum transmission power or the second maximum transmission power depending on intensity of the reception signal. To this end, if the call connection request signal is set to be transmitted up to six (6) times at user's one call connection attempt, the portable terminal can transmit the call connection request signal with the first maximum transmission power up to three times in a weak electric field area, and if a call connection is not made with the first maximum transmission power, the portable terminal can transmit the call connection request signal with the second maximum transmission power up to the next three times. Alternatively, when the user tries a call connection, the portable terminal can transmit the call connection request signal for a preset number of times (e.g., 3 times) with the first maximum transmission power, and if a call connection is not made with the first maximum transmission power, the portable terminal can transmit the call connection request signal while gradually increasing the transmission power to the second maximum transmission power by a predefined amount (e.g., 0.5 dBm). Also, when the user tries a call connection, the portable terminal can perform the process of transmitting the call connection request signal with the first maximum transmission power and if a call connection is not made with the first maximum transmission power, transmitting the call connection request signal with the second maximum transmission power, and can repeat the process for a preset number of times (e.g., 3 times).

Further, it was explained in the above that a call connection request is transmitted with the first maximum transmission power for three times and with the second maximum transmission power for three times, but the present invention is not limited to this. That is, the number of times of the call connection requests can be variously set according to designer's intention. For example, the portable terminal can transmit the call connection request signal with the first maximum transmission power for two times and with the second maximum transmission power for four times. Also, it was explained to transmit the call connection request signal up to six times at user's one call connection attempt, but the present invention is not limited to this. That is, the number of times of transmission of the call connection request signal can be set '7' or '8' according to designer's intention.

The method and apparatus for controlling transmission power having the above-described configuration can improve the transmission success rate of a portable terminal in a weak electric field area where intensity of reception signal is less than the reference value, and can improve user's convenience by minimizing battery current consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for controlling transmission power, the apparatus comprising:
    a storage unit configured to store a first maximum transmission power and a second maximum transmission power, the first maximum transmission power corresponding to a maximum power that can be transmitted when intensity of reception signal is a predefined reference value or more, and the second maximum transmission power corresponding to a maximum power that can be transmitted when intensity of the reception signal is less than the reference value;
    a controller configured to transmit a call connection request signal with the first maximum transmission power or with the second maximum transmission power depending on intensity of the reception signal when user tries a call connection; and
    a power amplifier module (PAM) configured to amplify the call connection request signal under the control of the controller.

2. The apparatus of claim 1, wherein the controller is configured to transmit a call connection request signal with the first maximum transmission power for a preset number of times if intensity of the reception signal is less than the reference value.

3. The apparatus of claim 2, wherein, if a call connection is not made, the controller is configured to transmit the call connection request signal with the second maximum transmission power for a preset number of times.

4. The apparatus of claim 2, wherein, if a call connection is not made with the first maximum transmission power, the controller is configured to transmit the call connection request signal while gradually increasing the transmission power from the first maximum transmission power to the second maximum transmission power by a predefined amount.

5. The apparatus of claim 1, wherein the controller is configured to perform a process of transmitting a call connection request signal with the first maximum transmission power if intensity of the reception signal is less than the reference value, and if a call connection is not made with the first maximum transmission power, control to repeat a process of transmitting the call connection request signal with the second maximum transmission power for a preset number of times.

6. The apparatus of claim 1, wherein the controller is configured to change the transmission power into the first maximum transmission power if the call connection is made with the second maximum transmission power.

7. The apparatus of claim 1, wherein the controller is configured to terminate the call connection request if a call connection is not made with the second maximum transmission power within a preset number of times.

8. A method for controlling transmission power, the method comprising:
    setting a first maximum transmission power corresponding to a maximum power that can be transmitted when intensity of a detected reception signal is a given reference value or more, and a second maximum transmission power corresponding to a maximum power that can be transmitted when intensity of the reception signal is less than the reference value;
    detecting intensity of reception signal; and
    transmitting a call connection request signal with the first maximum transmission power or with the second maximum transmission power depending on the intensity of the reception signal when user tries a call connection.

9. The method of claim 8, wherein transmitting the call connection request signal comprises:
    transmitting the call connection request signal with the first maximum transmission power for a preset number of times if intensity of the reception signal is less than the reference value at the user's call connection attempt; and
    transmitting the call connection request signal with the second maximum transmission power for a preset number of times if a call connection is not made with the first maximum transmission power.

10. The method of claim 8, wherein transmitting the call connection request signal comprises:
    transmitting the call connection request signal with the first maximum transmission power for a preset number of times if intensity of the reception signal is less than the reference value at the user's call connection attempt; and
    transmitting the call connection request signal while gradually increasing the transmission power up to the second maximum transmission power by a predefined amount if a call connection is not made with the first maximum transmission power.

11. The method of claim 8, wherein transmitting the call connection request signal comprises: repeating for a preset number of times the process of transmitting the call connection request signal with the first maximum transmission power, and if a call connection is not made with the first maximum transmission power, transmitting the call connection request signal with the second maximum transmission power.

12. The method of claim 8, further comprising: changing the transmission power to the first maximum transmission power after a given time if a call connection is made with the second maximum transmission power in a weak electric field area where intensity of the reception signal is less than the reference value.

13. The method of claim 8, further comprising: terminating the call connection request if a call connection is not made with the second maximum transmission power within a preset number of times.

14. A portable terminal capable of controlling transmission power, the portable terminal comprising:
- a storage unit configured to store a first maximum transmission power and a second maximum transmission power, the first maximum transmission power corresponding to a maximum power that can be transmitted when intensity of reception signal is a predefined reference value or more, and the second maximum transmission power corresponding to a maximum power that can be transmitted when intensity of the reception signal is less than the reference value;
- a controller configured to transmit a call connection request signal with the first maximum transmission power or with the second maximum transmission power depending on intensity of the reception signal when user tries a call connection; and
- a power amplifier module (PAM) configured to amplify the call connection request signal under the control of the controller.

15. The portable terminal of claim 14, wherein the controller is configured to transmit a call connection request signal with the first maximum transmission power for a preset number of times if intensity of the reception signal is less than the reference value.

16. The portable terminal of claim 15, wherein, if a call connection is not made, the controller is configured to transmit the call connection request signal with the second maximum transmission power for a preset number of times.

17. The portable terminal of claim 15, wherein, if a call connection is not made with the first maximum transmission power, the controller is configured to transmit the call connection request signal while gradually increasing the transmission power from the first maximum transmission power to the second maximum transmission power by a predefined amount.

18. The portable terminal of claim 14, wherein the controller is configured to perform a process of transmitting a call connection request signal with the first maximum transmission power if intensity of the reception signal is less than the reference value, and if a call connection is not made with the first maximum transmission power, control to repeat a process of transmitting the call connection request signal with the second maximum transmission power for a preset number of times.

19. The portable terminal of claim 14, wherein the controller is configured to change the transmission power into the first maximum transmission power if the call connection is made with the second maximum transmission power.

20. The portable terminal of claim 14, wherein the controller is configured to terminate the call connection request if a call connection is not made with the second maximum transmission power within a preset number of times.

\* \* \* \* \*